US009723224B2

(12) United States Patent
Slaby et al.

(10) Patent No.: US 9,723,224 B2
(45) Date of Patent: Aug. 1, 2017

(54) ADAPTIVE LOW-LIGHT IDENTIFICATION (71) Applicant: Google Technology Holdings LLC, Mountain View, CA (US)

(72) Inventors: Jiri Slaby, Buffalo Grove, IL (US); William S. Pierce, Algonquin, IL (US); Lawrence A. Willis, McHenry, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 206 days.

(21) Appl. No.: 14/283,276

(22) Filed: May 21, 2014

(65) Prior Publication Data

US 2015/0281599 A1 Oct. 1, 2015

Related U.S. Application Data

(60) Provisional application No. 61/972,533, filed on Mar. 31, 2014.

(51) Int. Cl.
*H04N 5/33* (2006.01)
*H04N 5/265* (2006.01)
(Continued)

(52) U.S. Cl.
CPC ......... *H04N 5/265* (2013.01); *G06F 17/3028* (2013.01); *G06F 17/30247* (2013.01);
(Continued)

(58) Field of Classification Search
CPC ........ H04N 5/265; H04N 5/332; H04N 5/232; H04N 5/23293; H04N 5/2351;
(Continued)

(56) References Cited

U.S. PATENT DOCUMENTS 6,597,807 B1   7/2003   Watkins et al.
6,791,472 B1   9/2004   Hoffberg
(Continued)

FOREIGN PATENT DOCUMENTS

EP   1879148 A2   1/2008
EP   2487913 A2   8/2012
(Continued)

OTHER PUBLICATIONS

"Integrated multilevel image fusion and match score fusion of visible and infrared face images for robust face recognition"; Singh, Vatsa, Noore; 2007.*

(Continued)

*Primary Examiner* — Jared Walker
(74) *Attorney, Agent, or Firm* — Shumaker & Sieffert, P.A (57) ABSTRACT

This document describes techniques and apparatuses for implementing adaptive low-light identification. These techniques and apparatuses enable a computing device to capture infrared (IR) imagery of a person and determine, based on previously-captured IR imagery of multiple people, an identity of the person. Visible-light imagery of the identified person can then be retrieved and combined with the IR imagery to provide composite imagery of the person, which is presented to a user. By so doing, the user can more-easily identify the person, particularly in low-light conditions.

20 Claims, 7 Drawing Sheets

(51) Int. Cl.
*G06F 17/30* (2006.01)
*G06K 9/00* (2006.01)
*H04N 5/232* (2006.01)
*G06T 5/50* (2006.01)
*H04N 5/235* (2006.01)

(52) U.S. Cl.
CPC ............ *G06K 9/00288* (2013.01); *G06T 5/50* (2013.01); *H04N 5/232* (2013.01); *H04N 5/23245* (2013.01); *H04N 5/23293* (2013.01); *H04N 5/332* (2013.01); *G06T 2207/10024* (2013.01); *G06T 2207/10048* (2013.01); *G06T 2207/20221* (2013.01); *H04N 5/2351* (2013.01)

(58) Field of Classification Search
CPC ........ H04N 5/23216; H04N 5/33; G06T 5/50; G06T 2207/10048; G06T 2207/10024; G06T 2207/30196; G06K 9/00288; G06F 17/3028
USPC .......................................................... 348/164
See application file for complete search history.

(56) References Cited

U.S. PATENT DOCUMENTS

| | | | | |
|---|---|---|---|---|
| 6,792,136 | B1* | 9/2004 | Niesen | G06T 11/001 250/330 |
| 7,571,051 | B1 | 8/2009 | Shulman | |
| 7,796,081 | B2 | 9/2010 | Breed | |
| 8,339,508 | B2 | 12/2012 | Levy | |
| 2006/0266942 | A1* | 11/2006 | Ikeda | H04N 5/23238 250/334 |
| 2008/0024608 | A1* | 1/2008 | Hahn | B60R 1/00 348/148 |
| 2010/0225766 | A1* | 9/2010 | Haigh | G01J 5/02 348/164 |
| 2010/0280751 | A1 | 11/2010 | Breed | |
| 2011/0117532 | A1 | 5/2011 | Relyea | |
| 2012/0242697 | A1 | 9/2012 | Border | |
| 2013/0004016 | A1* | 1/2013 | Karakotsios | G06K 9/00355 382/103 |
| 2013/0050395 | A1 | 2/2013 | Paoletti | |
| 2013/0300850 | A1* | 11/2013 | Millikan | A61B 5/0077 348/77 |

FOREIGN PATENT DOCUMENTS

| | | |
|---|---|---|
| EP | 1847112 B1 | 6/2013 |
| EP | 2608528 A1 | 6/2013 |
| JP | 2011066809 A | 3/2011 |
| KR | 20120038755 A | 4/2012 |

OTHER PUBLICATIONS

International Search Report and Written Opinion correlating to PCT/US2015/030978 dated Sep. 30, 2015, 12 pages.
Infrared Cameras Now Small Enough to Be in Your Phone, Popular Mechanics, http://www.popularmechanics.com/technology/gadgets/news/infrared-cameras-now-small-enough-to-be-in-your-phone-15827860, downloaded from the internet: May 19, 2014, all pages.
Image and Visual Represenatation Group IVRG, Combining near-infrared and visible images, EPFL Ecole Polytechnique Federal De Lausanne, http://ivrg.epfl.ch/research/infrared/enhancement, downloaded from internet May 19, 2014, all pages.
Yanli Wang; Zhe Chen, "Scene matching navigation based on multisensor image fusion", SPIE Digital Library, From Conference vol. 5286, Third International Symposium on Multispectral Image Processing and Pattern Recognition, 788 (Sep. 29, 2003); doi:10.1117/12.538650, all pages.
Junju Zhang et al.: "Region-Based Fusion for Infrared and LLL Images", http://webcache.goog/eusercontent.com/search?q=cache:http://www.intechopen.com/download/pdf/12994, downloaded from internet: May 19, 2014, all pages.
Kogut, G. et al.: Sensor Fusion for Intelligent Behavior on Small Unmanned Ground Vehicles, Proceedings of the SPIE—vol.6561, Unmanned Systems Technology IX, p. 65611V (May 2, 2007), all pages.
Schlachtman, "Using Monocular Vision and Image Correlation to Accomplish Autonomous Localization," Retrieved from http://digitalcommons.calpoly.edu/cgi/viewcontent.cgi?article=1336&context=theses, Jun. 2010, 55 pp.
Zhang et al., "Region-Based Fusion for Infrared and LLL Images," Image Fusion, InTech, 2011, pp. 285-302.
International Preliminary Report on Patentability from International Application No. PCT/US2015/030978, mailed Dec. 21, 2016, 8 pp.
Jiang Yu Zheng et al., "Pervasive Scene Map on Wireless Devices for City Navigation", 2009 International Conference on Network-Based Information Systems, Aug. 19, 2009, 8 pages.

* cited by examiner

ADAPTIVE LOW-LIGHT IDENTIFICATION

BACKGROUND

This background description is provided for the purpose of generally presenting the context of the disclosure. Unless otherwise indicated herein, material described in this section is neither expressly nor impliedly admitted to be prior art to the present disclosure or the appended claims.

The human eye often has difficulty perceiving imagery or scenery in low-light conditions, such as at night. This inability to see at night also worsens as a person ages because the anatomy of the human eye deteriorates over time. Examples of this deterioration may include clouding of a lens, shrinking of a pupil, and loss of photoreceptors or sensitivity thereof. As such, and particularly for adults, the inability to see in low-light conditions can be inconvenient or frustrating, such as when approaching other people that may be known or are unknown.

Further, existing technology, which may be leveraged to augment human night vision, also suffers from day and night performance disparities. For example, image sensors of computing devices are often designed to function in daylight, which results in poor imaging capabilities in low-light conditions. Thus, attempting to use an image sensor of a computing device to identify people at night often provides no benefit to a user and may further contribute to the user's frustration.

BRIEF DESCRIPTION OF THE DRAWINGS

Techniques and apparatuses enabling adaptive low-light identification are described with reference to the following drawings. The same numbers are used throughout the drawings to refer to like features and components.

DETAILED DESCRIPTION

The human eye is typically unable to accurately perceive people or imagery in low-light conditions, whether at night or in unlit indoor spaces. At the very least, this can be inconvenient for a person attempting to identify a person in low-light conditions, and, in some cases, may even be unsafe. Even conventional computing devices, which are capable of providing identification services, are often of little use in low-light conditions due to their inherent design for daylight operation.

This disclosure describes techniques and apparatuses that facilitate adaptive low-light identification, which enable a computing device to capture infrared (IR) imagery of a person and retrieve, based on the IR imagery of the person, previously-captured imagery of the person (e.g., a visible-light image) that corresponds with the IR imagery. The IR imagery and previously-captured imagery can then be combined (e.g., fused) to provide composite imagery, which is presented to a user. By so doing, the user's view of the person can be enhanced, particularly in low-light conditions. For example, when the previously-captured imagery includes color profile picture of a particular person, the composite imagery presented to the user may include a visible-light image of the particular persons face. This can be effective to allow the user to identify, at night, a person presented in virtual daylight conditions.

The following discussion first describes an operating environment, followed by techniques that may be employed in this environment, and ends with example apparatuses.

Operating Environment

Figure 1:
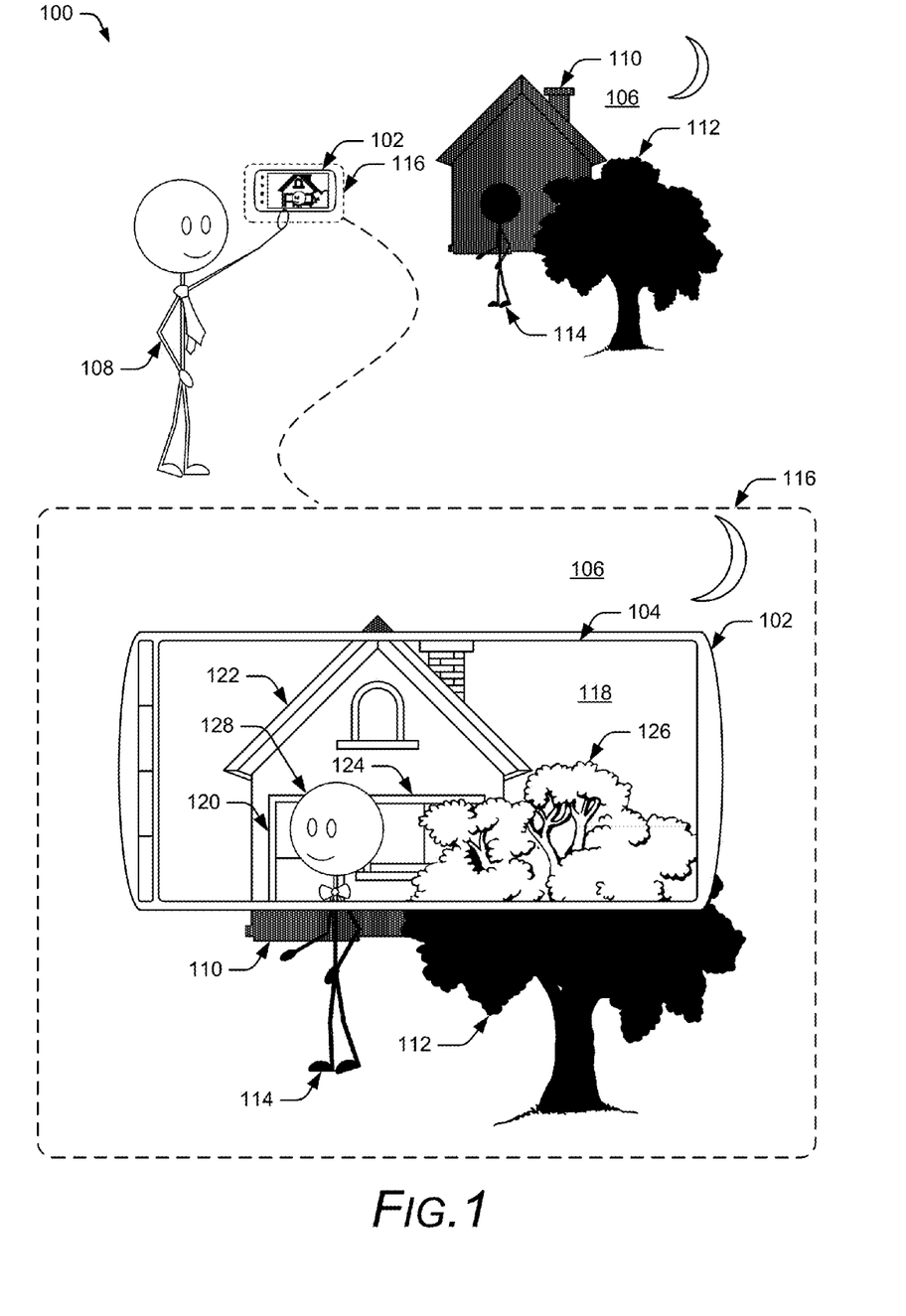
FIG. 1 illustrates an example environment in which techniques of adaptive low-light identification can be implemented.

FIG. 1 illustrates an example environment 100 in which techniques of adaptive low-light identification can be implemented. Environment 100 includes a computing device 102 having a display 104 through which imagery (e.g., scenery, people, or animals) of location 106 is presented to a user. Imagery of location 106 is captured by a camera (not shown) of computing device 102 or another device (not shown) associated with computing device 102. In some embodiments, the camera of computing device 102 or the other device is capable of sensing light that is not perceivable by the human eye, such as infrared (IR) light that may include long-wavelength IR (LWIR) thermal imaging, illuminated near IR (NIR), or low-lux light. For example, assuming user 108 is at location 106 at night, the camera of computing device 102 can capture IR imagery of people or objects at location 106.

Display 104 may present a user interface for configuring the camera of computing device 102 or selecting view modes through which imagery of location 106 is presented by display 104 (e.g., a viewfinder interface). The view modes of computing device 102 may include a normal daylight view mode, an IR view mode, and one or more adaptive low-light view modes, which are described below. Which imagery of location 106 presented by display 104 depends on how user 108 orientates computing device 102 with respect to location 106 or environment 100. An example of one such orientation is shown in FIG. 1, in which user 108 is shown standing in front of house 110, tree 112, and person 114 of location 106. In this particular example, because user 108 is at location 106 at night, house 110, tree 112, and person 114 appear to user 108 when not viewed through display 104, as dark objects overcast by moonlight.

When user 108 orients computing device 102 (and the camera thereof) toward location 106, user 108 can see respective portions of house 110, tree 112, and person 114 through display 104. For visual clarity, a view of location 106 from a perspective of user 108 is shown at detailed view 116. As shown by detailed view 116, some imagery of location 106 can be viewed through display 104, while other imagery of location 106 is visible around the periphery of computing device 102. In this particular example, imagery shown through display 104 is shown as composite imagery 118, which is provided by a low-light view mode of computing device 102. Here, features of house 110, tree 112, and person 114 that were previously not visible due to darkness, such as door 120, roof 122, window 124, leaves 126, and face 128 of person 114 are visible in composite imagery 118.

Generally, a low-light view mode can be implemented by leveraging capabilities of the camera and other components of computing device 102 to provide composite imagery. In some aspects, the camera captures IR imagery of a person and compares the IR imagery with previously-captured IR imagery of one or more people to determine an identity of the person. Computing device 102 can then retrieve, based on the identity of the person, previously-captured visible-light imagery of that person, such as profile pictures, imagery captured at daytime, or imagery captured under artificial lighting. The previously-captured visible-light imagery of the location and previously-captured visible-light imagery of the person can then be combined with the IR imagery to provide composite imagery of the person at that location. Here, note that the term visible-light in the general context of this disclosure is not intended to be limiting and may include, or be used interchangeably with, light of any suitable type or source, such as daylight, sunlight, artificial light, and the like.

In some cases, portions of the previously-captured visible-light imagery are oriented and superimposed over the IR imagery effective to present a daytime or daylight view of the person. In the context of the present example, this is shown in FIG. 1 as face 128 of person 114 that is superimposed over IR imagery of location 106, while other portions of person 114 are not visible without the aid of computing device 102. This is but one example of implementing adaptive low-light personal identification to provide composite imagery of a person. How computing device 102 is implemented to provide this and other embodiments of adaptive low-light identification may vary and is described below.

Figure 2:
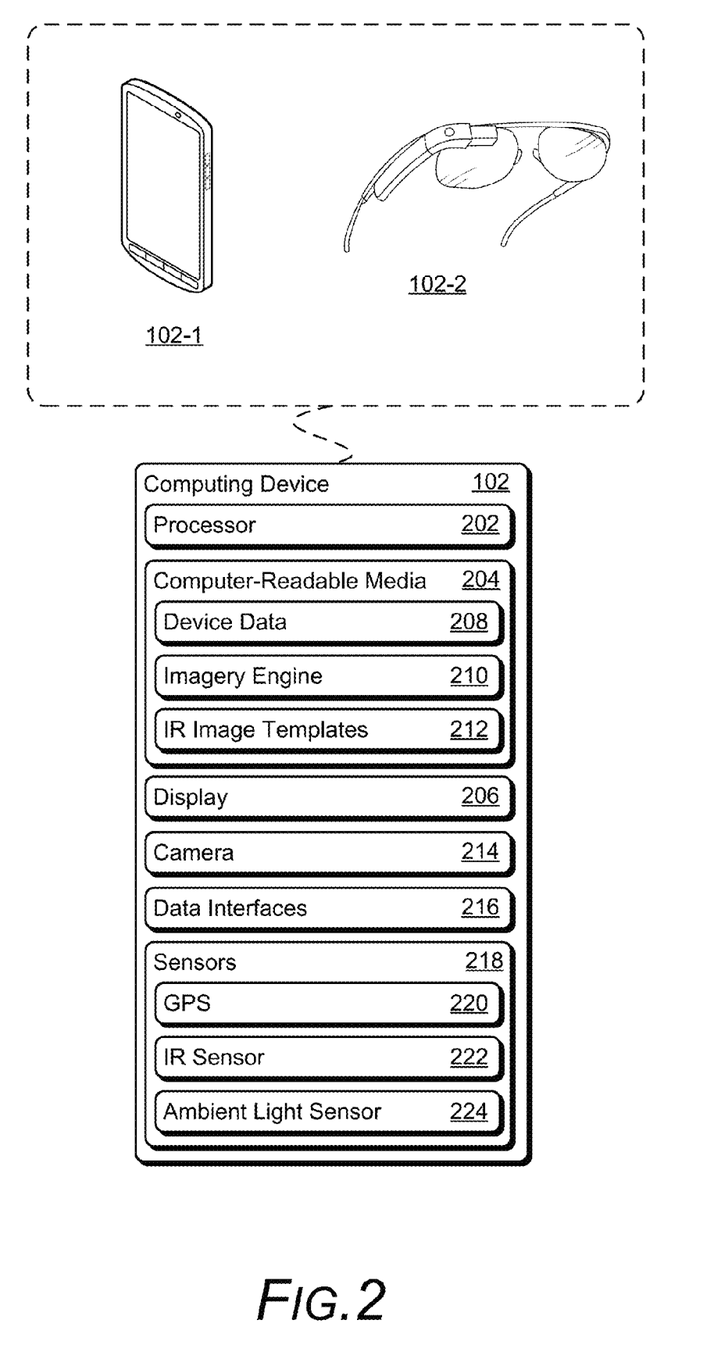
FIG. 2 illustrates example computing devices capable of implementing adaptive low-light identification.

More specifically, consider FIG. 2, which illustrates an example embodiment of computing device 102 of FIG. 1. Computing device 102 can be, or include, many different types of computing or electronic devices capable of implementing adaptive low-light identification. In this example, computing devices 102 are shown as smart phone 102-1 and smart glasses 102-2, though other devices are contemplated. Other computing devices 102 may include, by way of example only, a cellular phone, notebook computer (e.g., netbook or ultrabook), camera (compact or single-lens reflex), smart-watch, tablet computer, personal media player, personal navigation device (e.g., global positioning system), vehicle navigation system, heads-up-display (HUD), gaming console, desktop computer, video camera, or portable gaming device. In some cases, embodiments of adaptive low-light identification may be implemented by two or more devices, such as a computing device and accessory devices (e.g., standalone camera and/or display devices) that are operably coupled with the computing device. Alternately or additionally, the computing device may be integrated with, or operably coupled with, one or more components of a smart vehicle, the windshield or windows of which may serve as a display to present views of an environment as virtual daylight reality.

Computing device 102 includes processor 202, which may be configured as a single or multi-core processor capable of enabling various functionalities of computing device 102. In some cases, processor 202 includes a video processing core for processing various images or video of computing device 102. Processor 202 may be coupled with, and may implement functionalities of, any other components or modules of computing device 102 that are described herein.

Computing device 102 includes computer-readable media 204 (CRM 204) and display 206. Computer-readable media 204 includes device data 208, such as an operating system, firmware, or applications of computing device 102 that are executable by processor 202. Alternately or additionally, device data 208 may include various user data, such as images, music, documents, emails, contacts, and the like. CRM 204 also includes imagery engine 210 and IR image templates 212, which in this example are embodied as computer-executable code stored on CRM 204.

Imagery engine 210 can combine, merge, or otherwise integrate multiple sources of imagery or video. For example, imagery engine 210 can combine IR imagery with any suitable previously-captured imagery (e.g., visible-light imagery) to provide composite imagery in accordance with one or more aspects of adaptive low-light identification. Alternately or additionally, imagery engine may also manage visual aspects or effects applied to composite imagery presented by display 206. For example, imagery engine 210 may alter (e.g., control or manipulate) an aspect ratio, pan, rotation, optical-depth, zoom, crop, stretch, or shrink applied to IR imagery or previously-captured imagery presented by display 206. Further implementations and uses of imagery engine 210 vary and are described below in greater detail.

IR image templates 212 include previously-captured IR imagery of one or more people. IR image templates 212 may also include, or be associated with, information useful to identify the one or more people for which the previously-captured IR imagery is available. In some cases, IR image templates 212 are created through an enrollment process in which a visible-light image and thermography (e.g., IR images) of a person is enrolled to capture a unique biometric temperature distribution of the person. Although shown as stored in CRM 204, IR image templates 212 may also be stored in a remote repository, such as a server, social media site, or cloud service. Alternately or additionally, visible-light images of the people may also be retrieved from, or updated by accessing, a remote repository.

Display 206 presents imagery or content for viewing by a user. Display 206 may be implemented as, or similar to, display 104 as described with reference to FIG. 1. Alternately, display 206 may be implemented as a screen, projector, or lens of a remote device, such as a vehicle windshield, or as a lens (projection or otherwise) of smart glasses 102-2 or virtual reality glasses. In some cases, the user can interact with content-related applications or graphical user-interfaces of computing device 102 through display 206. In such cases, the display may be associated with, or include, a touch-sensitive input device (e.g., touch-screen) through which user input is received. Display 206 can be configured as any suitable type of display, such as an organic light-emitting diode (OLED) display, active matrix OLED display, liquid crystal display (LCD), in-plane shifting LCD, transparent LCD cell, projection display, projector lens, and so on.

Computing device 102 may also include camera 214, which is configured to sense or capture imagery or scenery surrounding computing device 102. In this example, camera 214 is implemented on a surface of computing device 102 that is opposite a surface on which display 206 is implemented. In some cases, camera 214 is implemented on the same surface as display 206 or as part of an accessory device associated with computing device 102. In at least some embodiments, display 206 presents real-time imagery captured by forward-facing camera 214, such as when configured as a viewfinder of computing device 102. Thus, as a user orients or re-orients computing device 102 within an environment, imagery presented by display 206 changes as camera 214 captures different imagery of the environment. In at least some embodiments, camera 214 may be implemented as an accessory device (e.g., wearable accessory or standalone camera) that communicates with a display device, a display associated with a computing device (e.g., computing device 102), or a smart vehicle having windows configured as displays to present a virtual daylight reality. Alternately or additionally, camera 214 may be implemented as a vehicle mounted camera associated with a navigation or imaging system of the vehicle, such as when implemented in a vision-enabled vehicle.

In some embodiments, camera 214 may be sensitive to spectral ranges of light that are different from light that is visible to the typical human eye. These different spectral ranges of camera 214 may include infrared light (e.g., LWIR or NIR), ultraviolet light, low-lux light, or increased sensitivity to light within a particular range of visible light. In some cases, light captured in a different spectral range is leveraged to provide a low-light view mode in which the light of the different spectral range is visually represented via display 206 (e.g., thermal or night vision).

Computing device 102 includes data interfaces 216 for communicating data via a network or other connection. In some cases, these data interfaces 216 are wireless transceivers for communicating via a wireless network (not shown) or directly with other devices. Examples of these wireless networks include a cellular network, wireless wide-area network (WWAN), wireless local-area network (WLAN), and wireless personal-area network (WPAN), each of which may be configured, in part or entirely, as infrastructure, ad-hoc, or mesh networks. For example, an interface configured as a short-range wireless transceiver may communicate over a WPAN in accordance with a Bluetooth™ protocol.

In some embodiments, data interfaces 216 enable multiple devices to implement adaptive low-light identification. For example, smart phone 102-1 and smart glasses 102-2 may each implement different, although possibly redundant, components or functions for implementing an adaptive low-light view mode. In the context of this example, imagery engine 210 may reside on smart phone 102-1, while smart glasses 102-2 implement display 206 and camera 214. In such cases, data (e.g., imagery or video data) can be communicated between smart phone 102-1 and smart glasses 102-2 via respective data interfaces 216 of each device.

Alternately or additionally, data interfaces 216 include wired data interfaces for communicating with other devices, such as local area network (LAN) Ethernet transceiver, serial data interface, audio/video port (e.g., high-definition multimedia interface (HDMI) port), or universal serial bus (USB) port. These wired data interfaces may be implemented using standard connectors or through the use of proprietary connectors and associated cables providing enhanced security or interconnect density.

Computing device 102 may also include sensors 218, which enable computing device 102 to sense various properties, variances, or characteristics of an environment in which computing device 102 operates. In this particular example, sensors 218 include a global positioning system (GPS) 220, infrared (IR) sensor 222, and ambient light sensor 224. GPS 220 is capable of determining a geographic location and other navigational information (e.g., velocity or heading) of computing device 102 via signals received from navigation satellites. When the navigational satellites are unavailable, GPS 220 may provide an approximate location of computing device 102 by performing dead-reckoning calculations, which rely on other sensors, such as inertial sensors and accelerometers. Location of computing device 102 may also be determined using cellular tower triangulation and WiFi® detection as commonly known in the art. Alternately or additionally, orientation of computing device 102 can be provided by an accelerometer and/or magnetometer.

IR sensor 222 is configured to provide infrared (IR) imagery of people, objects, or scenery toward which computing device 102 is oriented. IR sensor 222 may capture IR imagery in any suitable format, such as video, streams, or a series of images. IR sensor 222 may be implemented separately from, or integrated with, camera 214. Alternately or additionally, IR sensor 222 may be implemented as a microbolometer sensor based IR camera configured for thermal imaging (e.g., a thermal camera or LWIR sensitive thermal sensor), a standard camera with an IR filter open to IR light wavelengths, or any other suitable IR or low-light related imaging sensor. Ambient light sensor 224 enables computing device 102 to determine a level of ambient light present in an environment or location in which computing device 102 is situated. For example, information received from ambient light sensor 224 can be compared with a threshold to determine if computing device 102 is in daylight, darkness, moonlight, indoors, and so on.

Sensors 218 may also include other types of sensors, such as a proximity sensor, acoustic sensor, magnetic sensor, temperature/thermal sensor, micro-electromechanical systems, camera-type sensor (e.g., charge-coupled device sensor or complementary-metal-oxide semiconductor sensor), capacitive sensor, and so on. Alternately or additionally, sensors 218 enable interaction with, or receive input from, a user of computing device 102. In such a case, sensors 218 may include piezoelectric sensors, acoustic wave sensors, thermal touch sensors, capacitive touch sensors, input sensing-logic associated with hardware switches (e.g., keyboards, snap-domes, or dial-pads), and so on. In at least some embodiments, sensors 218 (e.g., an accelerometer or magnetometer) enable an orientation or direction of camera 214 or IR sensor 222 to be determined.

Example Techniques

The following discussion describes techniques enabling adaptive low-light identification. These techniques can be implemented utilizing the previously described entities, such as display 206, imagery engine 210, camera 214, GPS 220, or IR sensor 222 of FIG. 2. These techniques include example methods illustrated in FIGS. 3 and 5, which are shown as operations performed by one or more entities. The orders in which operations of these methods are shown or described are not intended to be construed as a limitation, and any number or combination of the described method operations can be combined in any order to implement a method, or an alternate method, including any of those illustrated by FIGS. 3 and 5.

Figure 3:
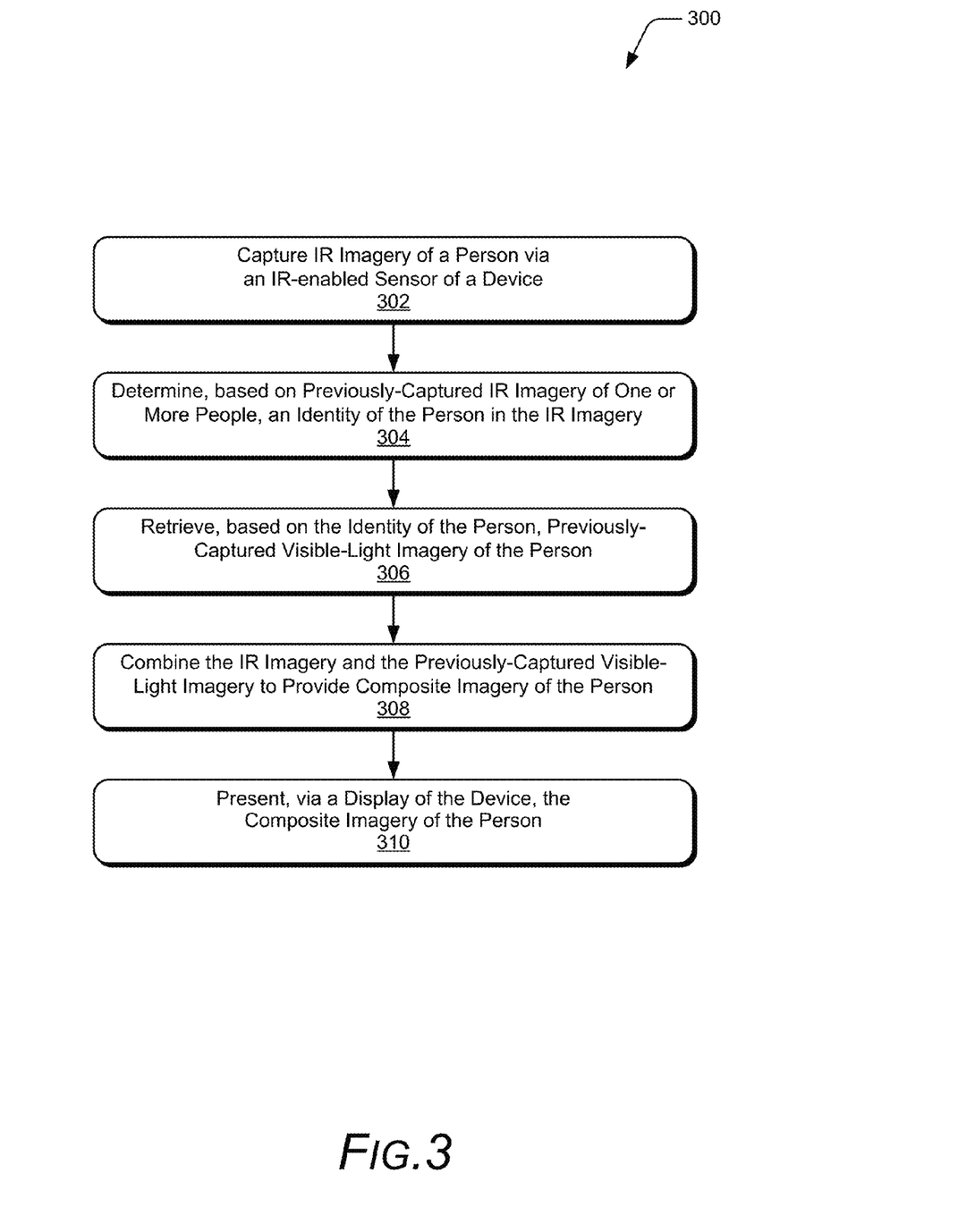
FIG. 3 illustrates an example method of combining infrared imagery and visible-light imagery.

FIG. 3 illustrates example method 300 of combining infrared imagery and previously-captured visible-light imagery.

At 302, infrared (IR) imagery of a person is captured via an infrared-enabled (IR-enabled) sensor of a device. The IR-enabled sensor of the device may be a dedicated IR sensor of the device or a camera of the device that is IR sensitive. Generally, the IR-enabled sensor captures IR imagery of a person, objects, or scenery of particular location. In some cases, the IR imagery is a stream of imagery or series of images captured in real time. In such cases, the IR imagery includes people, objects, or elements of a location that are presently at the location. Alternately or additionally, when the IR imagery is captured in low-light conditions, the IR imagery may lack color or other visual qualities that are perceivable in daylight conditions.

In some cases, the IR-enabled sensor or IR camera of the device can provide IR imagery at such a resolution that detailed physical characteristics of a person can be calculated or determined. For instance, an IR camera may enable a device to calculate a width of one or more fingernails of a person of interest. This fingernail width data along with a digit size or limb size, could be leveraged when determining an identity of the person. In such cases, features or characteristics of a person in captured IR imagery or an IR image template may include body shape, body size, walking gait, jewelry, clothing, facial biometrics, limb dimensions, finger and/or fingernail dimensions, and the like.

Figure 4:
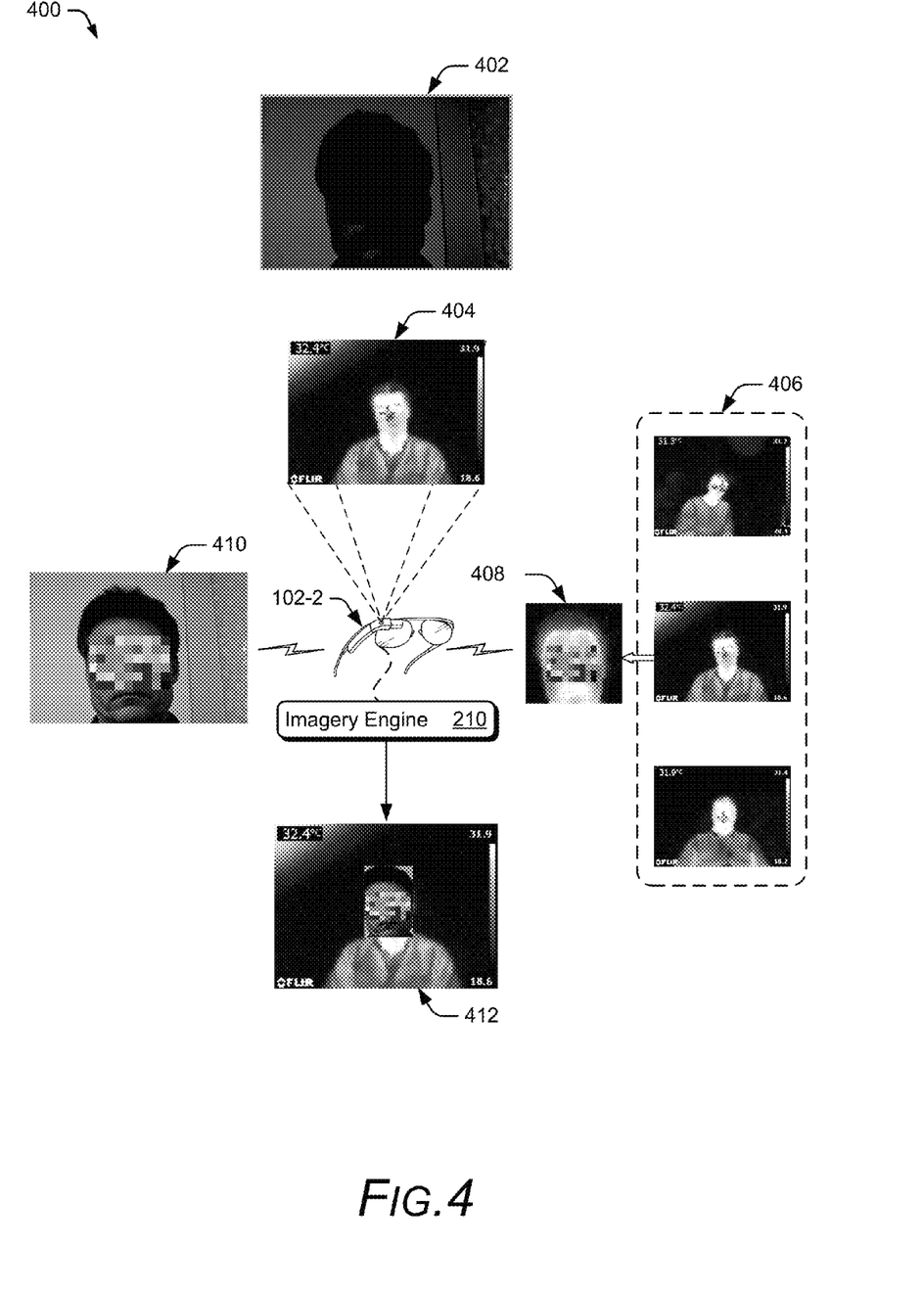
FIG. 4 illustrates an example of composite imagery provided in accordance with one or more embodiments.

By way of example, consider example environment 400 of FIG. 4, in which a user of smart glasses 102-2 is meeting a friend for dinner Assume here that the user has navigated to a house at which his friend lives, but, in the low-light conditions of night, is unable determine who the person is outside his friend's house. As the user looks toward the unidentified person, smart glasses 102-2 are oriented toward the person in the dark, who is shown from the perspective of the user as night imagery 402. Assume here that imagery engine 210 detects the low-light conditions and activates a low-light identification mode of smart glasses 102-2. While smart glasses 102-2 are oriented toward the person, IR sensor 222 captures IR thermal imagery 404 of the person. Here, note that IR thermal imagery 404 exposes thermography of the person, which may include a unique biometric temperature distribution of the persons head or body.

At 304, an identity of the person is determined based on previously-captured IR imagery of one or more people. The previously-captured IR imagery can be captured at any suitable time before determining the identity of the person and stored to a local memory or remote repository. For example, the previously-captured IR imagery can be captured earlier in a given day, a week prior to the determining, and so on. In some cases, the person is identified by comparing features or characteristics of the IR imagery with features or characteristics of the previously-captured IR imagery. In such cases, these features or characteristics of a person in either set of IR imagery may include body shape, body size, walking gait, jewelry, clothing, facial biometrics, and the like.

The previously-captured IR imagery may comprise IR image templates that were created through an enrollment process in which a visible-light image or thermography of a person is enrolled to capture a unique biometric temperature distribution of the person. These IR image templates may also include, or be linked with, information useful to identify a person associated with the template or an alias or profile (e.g., avatar) associated therewith. The IR image templates may be stored or accessed via a local memory or a remote repository. In some cases, when an identity cannot be determined from local set of IR image templates, additional IR templates may be retrieved from a remote repository to supplement the identification process.

In the context of the present example, imagery engine 210 compares IR thermal imagery 404 of the person with IR image template set 406, which in this particular example, is stored locally in CRM 204 of smart glasses 102-2 and includes thermography of three individuals. As shown at 406, each individual has a different facial thermal template, which enables different individuals to be identified based on captured IR imagery. Here, imagery engine 210 determines that features of IR thermal imagery 404 match features of previously-captured IR image 408 that is associated with one of the IR image templates stored locally. Once a match is determined, imagery engine 210 leverages information associated with the IR image template to determine an identity of the person in IR thermal imagery 404.

At 306, visible-light imagery of the person is retrieved based on the identity of the person. The visible-light imagery includes imagery of the person captured in daylight or artificial light, and may be stored as part of a visible-light image template. This visible-light image template may be implemented similar to an IR image template as described herein. In such cases, the visible-light image template may be stored in a local memory or a remote repository that is accessible via a network connection. The visible-light imagery may also be an online profile image or avatar image associated with the person or an online persona thereof. Alternately or additionally, the visible-light imagery of the person may be captured during an enrollment session in which the visible-light imagery is captured in conjunction with IR imagery of the person or information useful to identify the person.

Continuing the ongoing example, imagery engine 210 accesses locally stored visible-light imagery based on the identity of the person. In this particular example, imagery engine 210 retrieves visible-light image 410 from a locally stored visible-light image template (not shown). Alternately or additionally, imagery engine may search local or remote repositories for a more recent visible-light image or a visible-light image having higher detail density to obtain a more accurate visible-light image of the identified person.

At 308, the IR imagery and the visible-light imagery of the person are combined to provide composite imagery of the person. This may include integrating or fusing the visible-light imagery, or a portion thereof, with the IR imagery. In some cases, the visible-light imagery is superimposed over the IR imagery to provide a visible-light representation of the identified person. In other cases, the visible-light imagery is leveraged to colorize the IR imagery, such as to provide an adaptive real-time visible-light view of the person. Alternately or additionally, the visible-light imagery may be altered to match a context of the IR imagery, such as by resizing, scaling, tilting, shading, cropping, or re-orienting the visible-light imagery.

In the context of the present example, imagery engine 210 fuses visible-light image 410 with IR thermal imagery 404 to provide composite imagery 412, which provides a visible-light view of the identified person's face. Here, imagery engine 210 superimposes a portion of visible-light imagery over a corresponding portion of IR thermal imagery 404. Additionally, imagery engine 210 resizes a portion of visible-light image 410 such that facial features of the identified person appear proportional to a body of the person in IR thermal imagery 404. By fusing IR thermal imagery 404 and visible-light image 410, imagery engine 210 is able to provide a visible-light representation of the identified person.

At 310, the composite imagery of the person is presented via a display. The composite imagery of the person may be presented via a display of the device that captured the IR imagery of the person or through an accessory device operably coupled with the device. In some cases, the composite imagery of the person is presented to a user in real-time, such as through a live feed or stream of composite imagery. In such cases, the composite imagery of the person can be progressively presented as IR imagery and visible-light imagery that are integrated to provide the composite imagery of the person. Alternately or additionally, the composite imagery can be updated as a direction or orientation of the device changes with respect to the person. By so doing, a visible-light view of a person can be provided to a user in low-light conditions.

Concluding the present example, imagery engine 210 presents composite imagery 412 via display 206 of smart glasses 102-2. As shown in composite imagery 412, the user observes facial features of the person in visible-light conditions, which enables the user to conveniently identify his friend at night. Alternately or additionally, imagery engine 210 may disable adaptive low-light identification in response to a level of ambient light exceeding a predefined threshold, such as through detection by an ambient light sensor. In such instances, imagery engine 210 may capture additional visible-light images of the person to update a visible-light image template associated therewith.

Figure 5:
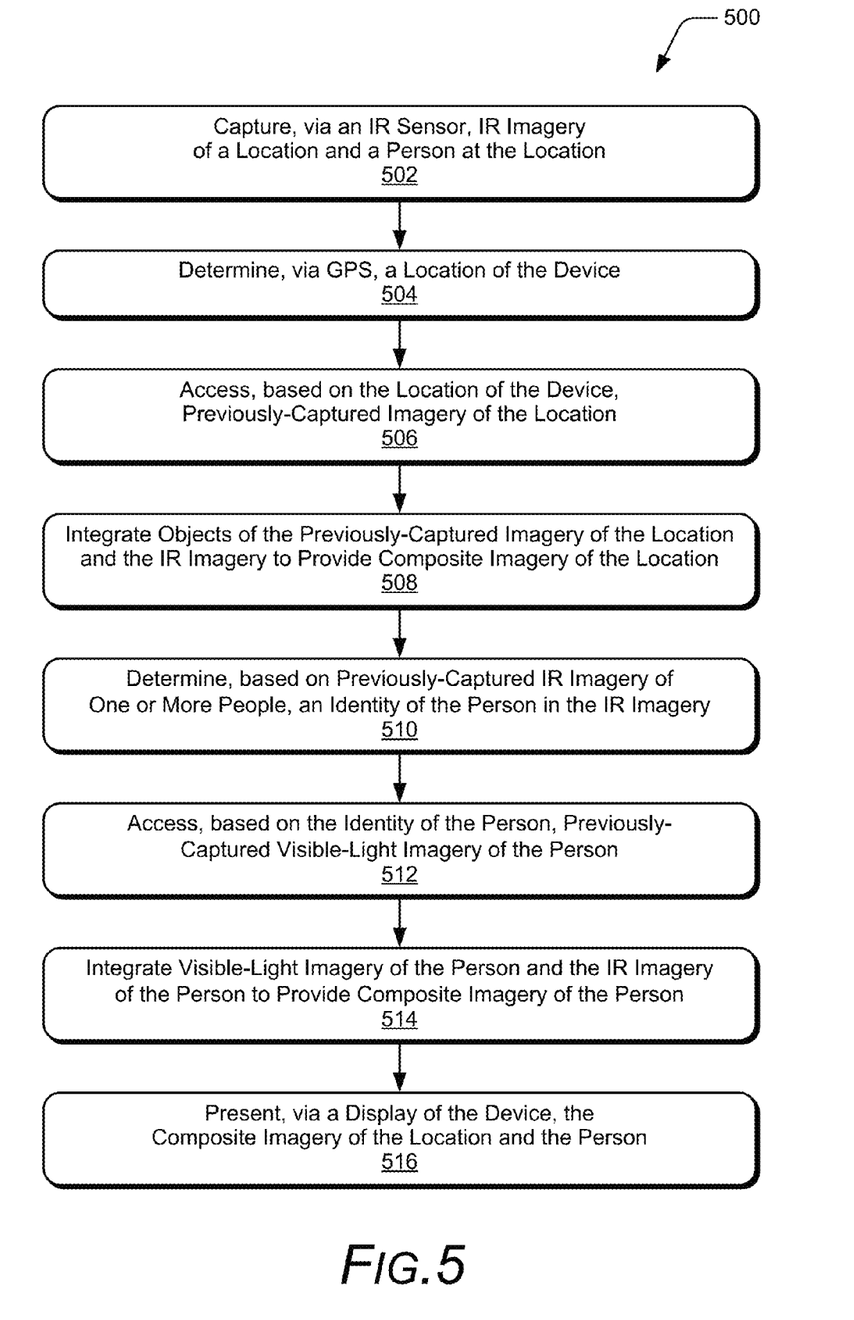
FIG. 5 illustrates an example method of providing composite imagery of a location and a person.

FIG. 5 illustrates methods 500 of providing composite imagery of a location and a person.

At 502, infrared (IR) imagery of a location is captured via infrared-enabled (IR-enabled) sensor of a device. The imagery of the location may include scenery, objects, or a person present at the location when the IR imagery is captured. In some cases, IR imagery of the person is captured using long-wavelength infrared (LWIR), which is effective to provide a thermal image of the person. In other cases, facial biometrics (e.g., face, iris, or eye veins) of the person may be imaged using near infrared (NIR) using active illumination, which can be effective to isolate the person in an area having a high density of individuals. Alternately or additionally, a voice profile of the person may be captured and stored with other IR-based biometric information.

Figure 6:
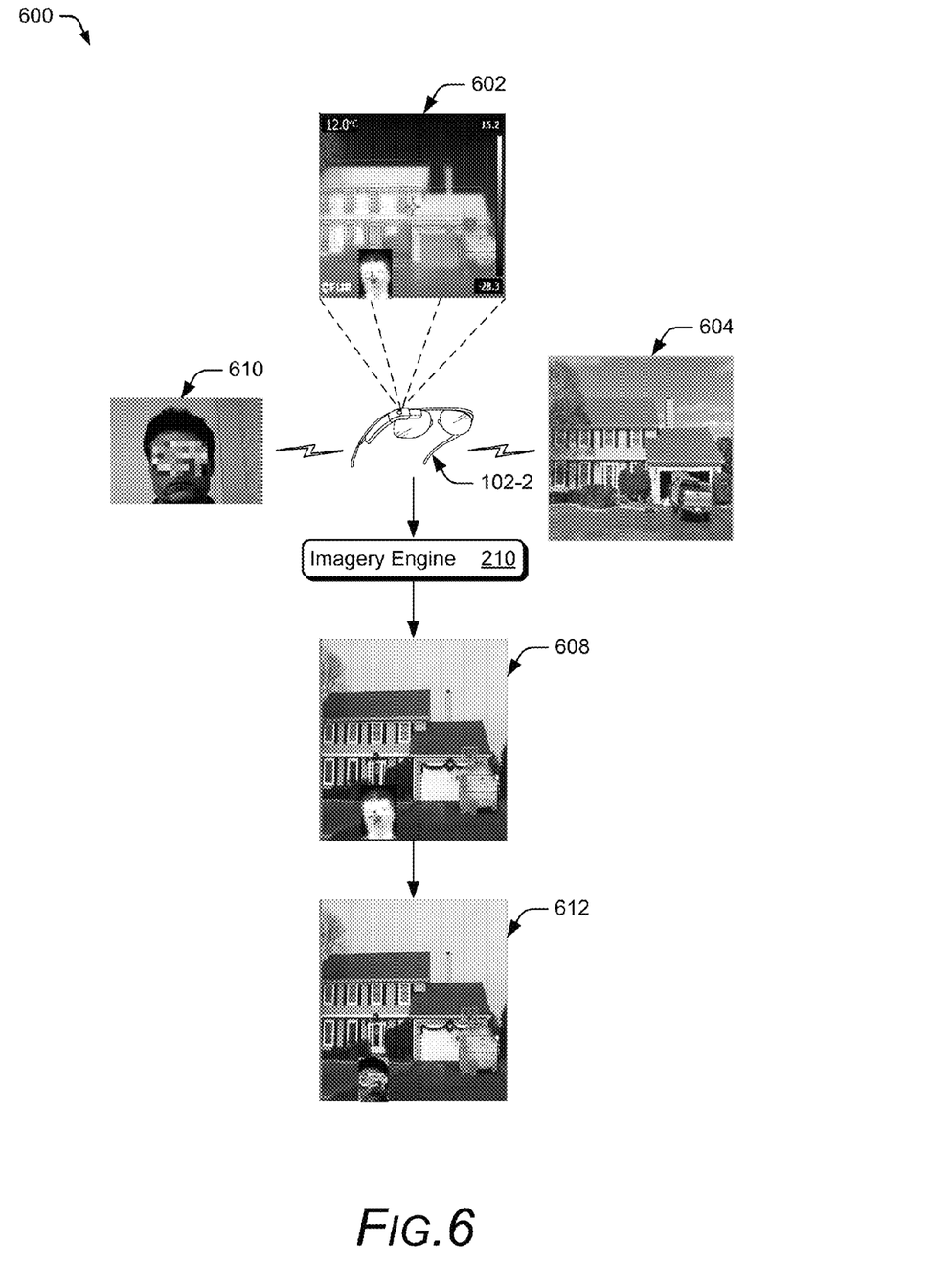
FIG. 6 illustrates an example of composite imagery of a location and a person provided in accordance with one or more embodiments.

By way of example, consider example environment 600 of FIG. 6, in which a user of smart glasses 102-2 is returning home after dark. Assume here that the user has returned home, but, in the low-light conditions of night, is unable to determine who the person is outside of his house. As the user approaches the unidentified person, smart glasses 102-2 are oriented toward the house and the person, thereby enabling IR sensor 222 to capture IR imagery 602 of the house and the unidentified person.

At 504, a location of the device is determined using GPS. In some cases, a direction or orientation of the device is also determined using other sensors of the device, such as a magnetometer, accelerometer, gyro, and the like. For example, a GPS module of a device may provide a geographical location of a device and a heading indicating which direction the device is moving. Additionally, an accelerometer or magnetometer of the device may provide an orientation or direction of which the device is facing. In the context of the present example, GPS 220 of smart glasses 102-2 indicates that the user is in front of his house and moving towards the house. Additionally, an accelerometer or magnetometer of smart glasses 102-2 provides an orientation of camera 214, and thus provides an orientation of the user view of his house with respect to the location of smart glasses 102-2.

At 506, imagery associated with the location of the device is accessed via a wireless interface of the device. This imagery includes imagery previously-captured at the location, such as visible-light imagery captured in daylight conditions, under artificial light, or different seasons of the year. The imagery may be received in any suitable format, such as a series of images, panoramic image of the location, stream of imagery, video feed, and so on. In at least some embodiments, the imagery received from the repository may include indicators, such as geo-tags, that are associated with elements of the imagery. Continuing the present example, imagery engine 210 accesses an online repository to retrieve previously-captured imagery 604, which includes a daylight view of his house and truck located on the left side of the driveway.

At 508, the imagery associated with the location and the IR imagery are integrated to provide composite imagery of the location. The imagery associated with the location may include previously-captured visible-light imagery, such as imagery captured at daytime or in daylight conditions. The operations to integrate the imagery may be performed at the device, by another local device (e.g., smart phone), or by a remote service provider (e.g., cloud server) to which the IR imagery and the previously captured are transmitted or accessible. In some cases, integrating the imagery includes adding color to the IR imagery or inserting visible-light objects over corresponding objects in the IR imagery. By so doing, a virtual visible-light view of the location can be provided in low-light conditions.

In the context of the present example, imagery engine 210 updates objects of the location (e.g., background objects) by fusing visible-light imagery over corresponding IR imagery to provide composite location image 608. As shown by composite image location 608, imagery engine 210 superimposes a visible-light image of the user's house over the IR imagery 602 to provide a daylight view of the house. Alternately or additionally, imagery engine 210 may further attempt to correlate and/or colorize other objects of IR imagery 602, such as the user's truck or basketball hoop.

At 510, an identity of the person is determined based on previously-captured IR imagery of one or more people. The previously-captured IR imagery may be captured or stored at any suitable time before determining the identity of the person. For example, the previously-captured IR imagery can be captured as part of an enrollment process in which IR imagery is captured and associated with information useful to identify the person or a visible-light image of the person. Alternately or additionally, the device may be configured to automatically perform the enrollment process periodically to ensure that IR image templates or visible-light image templates associated with a particular person are current.

In at least some aspects, the person is identified by comparing features or characteristics of the IR imagery with features or characteristics of previously-captured IR imagery. In such cases, these features or characteristics of a person in either set of IR imagery may include body shape, body size, walking gait, jewelry, clothing, facial biometrics, and the like. To increase a confidence level of the determined identity, behavioral information (e.g., known calendar information) associated with the multiple people may be leveraged as part of the identity determining process.

Continuing the ongoing example, imagery engine 210 compares IR imagery 602 with an IR image template set retrieved from an online repository, which in this particular example, is accessed via a wireless interface of smart glasses 102-2. Assume here that imagery engine 210 determines that the person in IR imagery 602 matches an IR image template of the user's brother. Imagery engine 210 further confirms the match of IR imagery 602 and the IR image template by verifying calendar information of the user's brother, which indicates his brother is currently on vacation and scheduled to visit the user during the current week.

At 512, visible-light imagery of the person is accessed based on the identity of the person. The visible-light imagery includes imagery of the person captured in daylight or artificial light, and may be stored as part of a visible-light image template. This visible-light image template may be implemented similar to an IR image template as described herein and/or created as part of an enrollment process that is separate from, or combined with, an enrollment process associated with creating IR image templates. The visible-light images or templates may be stored in a local memory of the device or a remote repository (e.g., social media site or cloud storage) that is accessible via a network connection. The visible-light imagery may also be an online profile image or avatar image associated with the person, or an online persona or alias associated therewith. In the context of the present example, imagery engine 210 accesses a social networking site to which the user and his brother belong and retrieves, based on the identity of the brother, visible-light image 610 of the user's brother (e.g., profile picture or other tagged image).

At 514, the IR imagery and the visible-light imagery of the person are integrated to provide composite imagery of the person. This may include fusing the visible-light imagery, or a portion thereof, with the IR imagery. In some cases, the visible-light imagery is superimposed or layered over the IR imagery to provide a visible-light representation of the identified person. In other cases, the visible-light imagery is leveraged to colorize the IR imagery, such as to provide an adaptive real-time visible-light view of the person. Alternately or additionally, the visible-light imagery may be altered to match a context or orientation of the IR imagery, such as by resizing, scaling, tilting, shading, cropping, or re-orienting the visible-light imagery.

Continuing the ongoing example, imagery engine 210 crops and resizes visible-light image 610 based on IR imagery 602 of the user's brother. Imagery engine 210 then updates the composite location image 608 by superimposing the modified visible-light image of the user's brother to provide composite image 612. As shown by composite image 612, objects and the person of IR imagery 602 have been updated to provide a virtual visible-light view of the location and the person. Additionally, although shown as a black and white illustration, it should be noted that features of the house and the user's brother can be shown in color as captured in visible-light imagery.

At 516, the composite imagery of the location and the person is presented via a display to a user. The display may be integral with, or separate from, the device that captures the IR imagery or integrates the IR imagery with the visible-light images. For example, the display may be integrated with a lens of a wearable computer, windshield of a car, windscreen of a motorcycle, or face shield of a helmet. Displaying the composite imagery can be effective to provide a visible-light or daylight rendering of the objects and people at the location in low-light conditions (e.g., at night).

Concluding the present example, imagery engine 210 presents the composite imagery of the location to the user via display 104 of smart glasses 102-2. This is effective to enable the user to view his house and his brother in virtual visible-light conditions despite the low-light conditions of night. By so doing, a comfort level of the user can be improved by enabling the user to discern, in low-light conditions, the true identity of an individual over greater-than-normal distances.

Example Electronic Device

Figure 7:
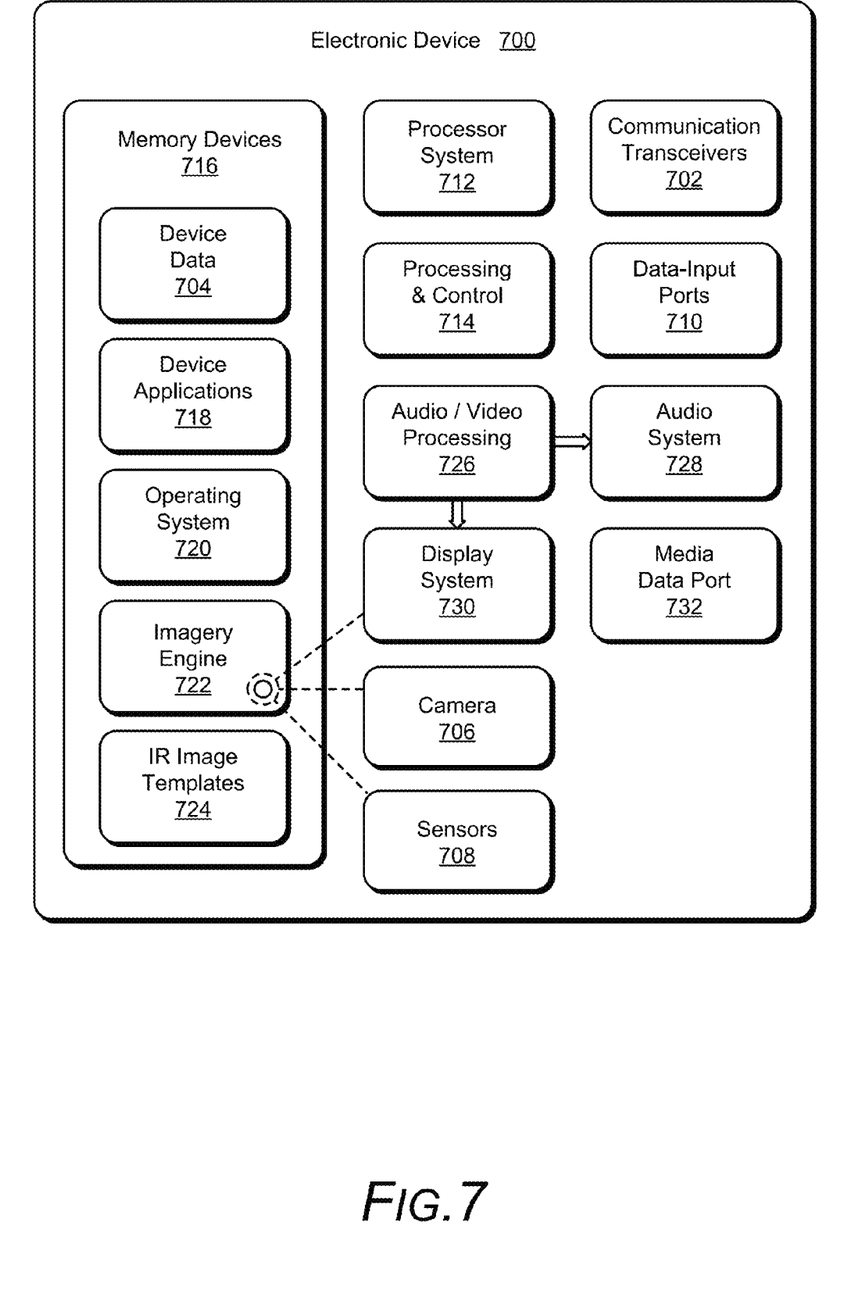
FIG. 7 illustrates various components of an electronic device that can implement techniques of adaptive low-light identification.

FIG. 7 illustrates various components of an example electronic device 700 that can be implemented as a computing device as described with reference to any of the previous FIGS. 1 through 6. Electronic device 700 can be, or include, many different types of devices capable of implementing adaptive low-light identification. For example, electronic device 700 may include a camera (compact or single-lens reflex), wearable display, heads-up-display (HUD), phone, personal navigation device, gaming device, Web browsing platform, pager, media player, or any other type of electronic device, such as the computing device 102 described with reference to FIG. 1.

Electronic device 700 includes communication transceivers 702 that enable wired or wireless communication of device data 704, such as received data and transmitted data. Example communication transceivers include WPAN radios compliant with various Institute of Electrical and Electronics Engineers (IEEE) 802.15 (Bluetooth™) standards, WLAN radios compliant with any of the various IEEE 802.11 (WiFi™) standards, WWAN (3GPP-compliant) radios for cellular telephony, wireless metropolitan area network radios compliant with various IEEE 802.16 (WiMAX™) standards, and wired LAN Ethernet transceivers.

In embodiments, electronic device 700 includes camera 706, such as camera 214 as described with reference to FIG. 2. Electronic device 700 may also include sensors 708, such as an infrared sensor, accelerometer, magnetometer, ambient light sensor, location sensor, or GPS as described above. Camera 706 and sensors 708 can be implemented to facilitate various embodiments of adaptive low-light identification.

Electronic device 700 may also include one or more data-input ports 710 via which any type of data, media content, and inputs can be received, such as user-selectable inputs, messages, music, television content, recorded video content, and any other type of audio, video, or image data received from any content or data source. Data-input ports 710 may include USB ports, coaxial cable ports, and other serial or parallel connectors (including internal connectors) for flash memory, DVDs, CDs, and the like. These data-input ports may be used to couple the electronic device to components, peripherals, or accessories such as keyboards, microphones, or cameras.

Electronic device 700 of this example includes processor system 712 (e.g., any of application processors, microprocessors, digital-signal processors, controllers, and the like) or a processor and memory system (e.g., implemented in a system-on-chip), which process computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively or additionally, the electronic device can be implemented with any one or combination of software, hardware, firmware, or fixed-logic circuitry that is implemented in connection with processing and control circuits, which are generally identified at 714. Although not shown, electronic device 700 can include a system bus, crossbar, interlink, switch fabric, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 700 also includes one or more memory devices 716 that enable data storage, examples of which include random-access memory, non-volatile memory (e.g., read-only memory (ROM), flash memory, EPROM, EEPROM, etc.), and a disk storage device. Memory devices 716 are implemented at least in part as physical devices that store information (e.g., digital or analog values) in storage media, which do not include propagating signals or waveforms. The storage media may be implemented as any suitable type of media such as electronic, magnetic, optic, mechanical, quantum, atomic, and so on. Memory devices 716 provide data-storage mechanisms to store the device data 704, other types of information or data, and various device applications 718 (e.g., software applications). For example, operating system 720 can be maintained as software instructions within memory devices 716 and executed by processors 712. In some aspects, imagery engine 722 and IR image templates 724 are embodied in memory devices 716 of electronic device 700. Although represented as a software implementation (e.g., as executable instructions or code), imagery engine 722 may be implemented as any form of a control application, software application, signal processing and control module, firmware that is installed on the device, a hardware implementation of the controller, and so on.

Electronic device 700 also includes audio and video processing system 726 that processes audio data and passes through the audio and video data to audio system 728 and to display system 730. Audio system 728 and display system 730 may include any modules that process, display, or otherwise render audio, video, display, or image data, such as imagery engine 722. Display data and audio signals can be communicated to an audio component and to a display component via an radio-frequency link, S-video link, HDMI, composite video link, component video link, digital video interface, analog audio connection, or other similar communication link, such as media data port 732. In some implementations, audio system 728 and display system 730 are external components to electronic device 700. Alternatively or additionally, display system 730 can be an integrated component of the example electronic device, such as part of an integrated display, wearable display, or touch interface. As described above, imagery engine 722 may manage or control display system 730, or components thereof, in aspects of adaptive low-light identification.

Although embodiments of adaptive low-light identification have been described in language specific to features and/or methods, the subject of the appended claims is not necessarily limited to the specific features or methods described. Rather, the specific features and methods are disclosed as example implementations of adaptive low-light identification.

The invention claimed is:

1. A method comprising:
receiving, by an electronic device, previously captured infrared imagery of one or more people;
associating, by the electronic device, one or more respective identities with the one or more people included in the previously captured infrared imagery;
receiving, by the electronic device, using an infrared-enabled sensor, infrared imagery of a person;
comparing, by the electronic device, the infrared imagery of the person with the previously captured infrared imagery of the one or more people;
responsive to determining, by the electronic device, and based on the comparing, a match between at least one feature of the infrared imagery of the person and a corresponding at least one feature of the previously captured infrared imagery of the one or more people, determining, by the electronic device, based on the match and on the one or more respective identities associated with the one or more people included in the previously captured infrared imagery, an identity of the person;
receiving, by the electronic device, based on the identity of the person, previously captured visible-light imagery of the person, wherein the previously captured visible-light imagery of the person and the previously captured infrared imagery of the one or more people are captured prior to the electronic device receiving the infrared imagery of the person;
combining the infrared imagery of the person and the previously captured visible-light imagery of the person to provide composite imagery of the person; and
presenting, by the electronic device for display, the composite imagery of the person.

2. The method of claim 1, wherein determining the identity of the person is further based on a location of the electronic device or behavioral information known about the one or more people.

3. The method of claim 2, further comprising determining the location of the electronic device by one of:
determining, by the electronic device, the location using a global positioning system of the electronic device;
determining, by the electronic device, the location using an association with one or more known wireless networks;
determining, by the electronic device, the location using geo-tagged elements within the infrared imagery of the person; or
determining, by the electronic device, the location based on a previously known location and by using a map and inertial data of the electronic device.

4. The method of claim 1, wherein the method is implemented in response to determining, by the electronic device using an ambient light sensor, that a level of ambient light is below a pre-determined threshold.

5. The method of claim 1, wherein the infrared-enabled sensor of the electronic device is configured to capture illuminated near-infrared light or a long-wavelength infrared thermal image.

6. The method of claim 1, wherein the electronic device comprises one of a smart phone, tablet computer, wearable computer, or vehicle-based computing system.

7. A method comprising:
receiving, by an electronic device using an infrared-enabled sensor, infrared imagery of both a location and a person at the location;
receiving, by the electronic device, based on location and orientation information associated with the electronic device, previously captured imagery of the location;
integrating, by the electronic device, objects of the previously captured imagery of the location with the infrared imagery of both the location and the person to provide composite imagery of the location;
receiving, by the electronic device, previously captured infrared imagery of one or more people;
comparing, by the electronic device, the infrared imagery of both the location and the person with the previously captured infrared imagery of the one or more people;
responsive to determining, by the electronic device, and based on the comparing, a match between at least one feature of the infrared imagery of both the location and the person and a corresponding at least one feature of the previously captured infrared imagery of the one or more people, determining, by the electronic device, based on the match and on one or more respective identities associated with the one or more people in the previously captured infrared imagery of the one or more people, an identity of the person;
receiving, by the electronic device, based on the identity of the person, previously captured visible-light imagery of the person, wherein the previously captured visible-light imagery of the person and the previously captured infrared imagery of the one or more people are captured prior to the electronic device receiving the infrared imagery of both the location and the person;

integrating, by the electronic device, the visible-light imagery of the person with the infrared imagery of both the location and the person to provide composite imagery of the person; and presenting, by the electronic device and for display at the electronic device, the composite imagery of the location and the composite imagery of the person.

8. The method of claim 7, further comprising:

determining, by the electronic device using a global positioning system, the location associated with the electronic device; and determining, by the electronic device using an accelerometer or a magnetometer, the orientation information associated with the electronic device.

9. The method of claim 7, wherein receiving the previously captured infrared imagery of the one or more people comprises receiving the previously captured imagery of the one or more people from a local repository or a remote repository.

10. The method of claim 7, wherein, prior to receiving the infrared imagery of both the location and the person, the electronic device receives at least one of:

the previously captured imagery of the location;
the previously captured infrared imagery of the one or more people; or
the previously captured visible-light imagery of the person.

11. The method of claim 7, wherein for each of the one or more people, the respective previously captured infrared imagery comprises an infrared image template that includes at least one thermal image associated with a respective person and information to identify the respective person.

12. The method of claim 11, wherein receiving the visible-light imagery of the person comprises accessing a local memory or a remote location storing a visible-light image template that includes at least one visible-light image associated with the person and information associating the at least one visible-light image with the person.

13. The method of claim 7, wherein the electronic device comprises one of a smart phone, tablet computer, wearable computer, or vehicle-based computing system.

14. An apparatus comprising:
one or more processors;
an infrared-enabled sensor configured to capture infrared imagery;
a display configured to present content; and
at least one non-transitory computer-readable storage medium storing instructions that are executable by the one or more processors to:
receive, via the infrared-enabled sensor, infrared imagery of both a location and a person at the location;
receive previously captured imagery of a location of the apparatus;
integrate the previously captured imagery of the location with the infrared imagery of both the location and the person to provide composite imagery of the location;
receive previously captured infrared imagery of one or more people;
compare the infrared imagery of both the location and the person with the previously captured infrared imagery of the one or more people;
responsive to determining, based on the comparing, a match between at least one feature of the infrared imagery of both the location and the person and a corresponding at least one feature of the previously captured infrared imagery of the one or more people, determine, based on the match and on one or more respective identities associated with the one or more people in the previously captured infrared imagery of the one or more people, an identity of the person;
receive, based on the identity of the person, previously captured visible-light imagery of the person, wherein the previously captured visible-light imagery of the person and the previously captured infrared imagery of the one or more people are captured prior to the electronic device receiving the infrared imagery of both the location and the person;
integrate the infrared imagery of both the location and the person with the previously captured visible-light imagery of the person to provide composite imagery of the person; and
present, via the display, the composite imagery of the location and the composite imagery of the person.

15. The apparatus of claim 14, further comprising a global positioning system module, and wherein the instructions stored on the at least one non-transitory computer-readable storage medium are further executable by the one or more processors to determine the location of the apparatus using the global positioning system module.

16. The apparatus of claim 14, wherein the previously captured visible-light imagery of the person comprises a visible-light image of the person, and wherein the instructions stored on the at least one non-transitory computer-readable storage medium are further executable by the one or more processors to:
receive, prior to receiving the infrared imagery of the person, the visible-light image of the person; or
retrieve, from an online repository, the visible-light image of the person.

17. The apparatus of claim 14, wherein the at least one feature of the previously captured infrared imagery of the one or more people includes at least one of body shape, body size, walking gait, jewelry, clothing, or facial biometrics.

18. The apparatus of claim 14, further comprising a sensor configured to detect a level of ambient light, and wherein the instructions stored on the at least one non-transitory computer-readable storage medium are further executable by the one or more processors to disable, in response to determining that the level of ambient light is below a predefined threshold, a visible-light view mode of the apparatus and present the composite imagery of the person.

19. The apparatus of claim 14, wherein the apparatus is configured in whole, or in part, as one of a smart phone, tablet computer, wearable computer, or vehicle-based computing system.

20. An apparatus comprising:
one or more processors;
an infrared-enabled sensor configured to capture infrared imagery;
a display configured to present content; and
at least one non-transitory computer-readable storage medium storing instructions that are executable by the one or more processors to:
receive previously captured infrared imagery of one or more people;
associate one or more respective identities with the one or more people included in the previously captured infrared imagery;

receive, using the infrared-enabled sensor, infrared imagery of a person;

compare the infrared imagery of the person with the previously captured infrared imagery of the one or more people;

responsive to determining, based on the comparing, a match between at least one feature of the infrared imagery of the person and a corresponding at least one feature of the previously captured infrared imagery of the one or more people, determine, based on the match and on the one or more respective identities associated with the one or more people included in the previously captured infrared imagery, an identity of the person;

receive, based on the identity of the person, previously captured visible-light imagery of the person, wherein the previously captured visible-light imagery of the person and the previously captured infrared imagery of the one or more people are captured prior to the apparatus receiving the infrared imagery of the person;

combine the infrared imagery of the person and the previously captured visible-light imagery to provide composite imagery of the person; and present, via the display, the composite imagery of the person.

* * * * *